US006899264B2

(12) United States Patent
Grieser et al.

(10) Patent No.: US 6,899,264 B2
(45) Date of Patent: May 31, 2005

(54) APPARATUS FOR PRODUCING A SLEEVE-SHAPED PRINTING FORM

(75) Inventors: Alfons Grieser, Sielenbach (DE); Eduard Hoffmann, Bobingen (DE); Lorenz Stotz, Augsburg (DE); Johann Winterholler, Friedberg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/745,317

(22) Filed: Dec. 22, 2003

(65) Prior Publication Data

US 2004/0155016 A1 Aug. 12, 2004

(30) Foreign Application Priority Data

Dec. 21, 2002 (DE) ........................................ 102 60 445

(51) Int. Cl.[7] .................................................. B23K 1/14
(52) U.S. Cl. ..................................... 228/49.4; 228/56.5
(58) Field of Search .............................. 228/49.4, 44.3, 228/47.1, 6.1, 56.5; 72/51

(56) References Cited

U.S. PATENT DOCUMENTS

| | | | | |
|---|---|---|---|---|
| 3,775,586 A | * | 11/1973 | Flint et al. | 219/121.63 |
| 3,835,682 A | * | 9/1974 | Elger | 72/18.1 |
| 4,540,167 A | | 9/1985 | Tamura et al. | |
| 5,149,934 A | * | 9/1992 | Haynie et al. | 219/121.27 |
| 5,499,580 A | | 3/1996 | Hoffmann et al. | |
| 5,557,960 A | | 9/1996 | Hoffmann et al. | |
| 5,992,727 A | | 11/1999 | Hoffmann et al. | |
| 6,112,663 A | * | 9/2000 | Ulrich et al. | 101/389.1 |
| 6,715,418 B2 | * | 4/2004 | Hoffmann et al. | 101/375 |

* cited by examiner

*Primary Examiner*—Jonathan Johnson
(74) *Attorney, Agent, or Firm*—Cohen, Pontani, Lieberman & Pavane

(57) ABSTRACT

An apparatus for producing a sleeve-shaped printing form from a plate-shaped blank includes a circular shaping device for the blank, a welding system, by means of which the plate edges forming the start and end of the printing form can be cut to size, maintaining their dimensions, and welded, and a displaceable device for picking up and for transporting the blank to the circular shaping device. The displaceable device has a fixing frame which has two lifting elements which can be adjusted in accordance with the distance between the plate edges to be joined and can be set along the respective plate edge. The leading plate edge is equipped with a register hole system, a lifting element comprising a pin register interacting with the register hole system while suction elements fix the leading edge, the other lifting element is configured with at least one suction element, the feed table being arranged so as to rise in the direction of the welding system, so that the blank, fixed by means of the pin register, aligns itself in an in-register and level manner, in the direction of its trailing edge, along the obliquely extending feed table on account of its inherent weight.

13 Claims, 2 Drawing Sheets

APPARATUS FOR PRODUCING A SLEEVE-SHAPED PRINTING FORM

BACKGROUND OF THE INVENTION

1. Field of the Invention

The invention relates to an apparatus of the type comprising a feed table for receiving a blank, a device for picking up and transporting the blank to a circular shaping device, and a welding system for cutting the blank to desired dimensions and welding the edges to form a sleeve-shaped printing plate.

2. Description of the Related Art

An apparatus of this type, which merely requires the plate-shaped blank to be inserted manually and, after the plate has been inserted, automatically permits the circular shaping operation and the exact register-maintaining positioning of the plate ends to be joined or to be welded, is described in U.S. Pat. No. 5,557,960.

In order to avoid cutting the plate-shaped blank to length outside this apparatus by means of a sheet-metal shear, while maintaining the dimensions, U.S. Pat. No. 5,499,580 discloses improving the production operation of the sleeve-shaped printing form in this apparatus to the effect that the plate-shaped blank, having a width corresponding to the form cylinder, is cut to a length that is greater than the circumference of the form cylinder. The blank in the in-register, rounded state is cut to length, maintaining its dimensions, in the welding apparatus by means of the laser beam as a cutting device, so that at least one piece of waste is produced. The piece of waste is removed, and the two plate edges forming the start and end of the printing form are set opposite each other with no overlap and are welded to each other.

U.S. Pat. No. 5,992,727 discloses a further generic apparatus. Here, above the feed table and in the housing which can be closed so as to be secure against radiation, an opening is left through which a device for fixing the plate-shaped blank as a planar blank, in the form of a fixing frame that can be adjusted to the appropriate plate size, can be moved out of the housing over the feed table in order to pick up the blank.

The fixing frame comprises two fixing bars which can be adjusted on a carriage in accordance with the distance between the plate edges of the blank to be joined and can be set longitudinally on the respective plate edge. The fixing frame further comprises a register device, which is designed such that it interacts with a register system on the plate-shaped blank. For example, the start and end of the blank can be fixed in-register to the fixing bars in each case by means of a pin register and a register hole system belonging to the plate-shaped blank.

SUMMARY OF THE INVENTION

It is an object of the invention to provide an improved generic apparatus which ensures an in-register production operation of the sleeve-shaped printing form, it being possible to produce sleeve-shaped printing forms of any length and diameter desired.

According to the invention, the apparatus is configured with an obliquely set or inclined feed table and possibly a fixing frame arranged parallel thereto, the inclination rising in the direction of the welding system. It is advantageous that the start of the blank, which is fixed by means of the register devices, is held firmly on the fixing frame, but, starting from the start, the blank is not yet fixed on the fixing frame in the direction of its end, so that the blank extends along the inclined feed table in the direction of its end as a result of its inherent weight and by this means aligns itself in an in-register and flatly planar manner. After this automatic alignment, the contact elements which hold the end or the trailing edge of the blank, for example sucking and fixing suction elements or electric holding magnets, are activated, the blank being accommodated on the fixing frame in-register as a result and it being possible to transport the blank in-register by means of the fixing frame. The feed table, the fixing frame, the circular shaping device and the welding system are advantageously inclined in the range between 5° and 60°, the inclination being selected such that the quality of the welded seam is not impaired. An inclination of 30° has proven to be particularly advantageous.

The apparatus according to the invention permits an in-register production operation of a sleeve-shaped printing form, less trim being produced when the blank is cut to length, maintaining its dimensions, in the in-register, rounded state, as a register hole system is required only for the start or the leading edge of the plate-shaped blank.

It is significant that, by means of the fixing means, configured as suction elements and pin registers, or contact elements on the fixing frame of the apparatus, both blanks made of non-magnetic material, for example aluminum, and blanks made of magnetizable material can be fixed and transported in a manner aligned so as to be planar or level.

The contact elements for fixing the end or trailing edge of the blank are advantageously arranged so as to be displaceable or positionable, and the fixing of the end is thus configured to be freely variable, so that blanks of any desired width can be fixed and processed to form a sleeve-shaped printing form. Scanning devices, search mechanisms or sensors are advantageously arranged on the positionable contact element, by means of which devices it is possible to determine the end and/or the length and/or the width of the blank and to position the contact elements appropriately. Furthermore, the non-displaceable contact elements are arranged on the fixing frame in such a way that the blank, from which the customarily used printing-form diameters and printing-form widths are produced, is gripped and transported without sagging from the fixing frame or from the contact elements.

Furthermore, it is significant that, by means of the apparatus, a sleeve-shaped printing form can be produced both with a variable diameter and with a variable length or printing width. Using the apparatus, it is therefore possible to produce a variable-format sleeve-shaped printing form, it being possible for the blank to have images set on it or no images set on it.

It is particularly significant that the use of the register system or register devices arranged "on one side" (at the start or at the leading end of the blank) is made possible, the system or devices comprising a pin register and a register hole system, and the production of an in-register multi-color set of sleeve-shaped printing forms, for example a four-color set, is made possible starting from plate-shaped blanks which have images set on them and are provided with a register hole system for maintaining register. The blank can be provided with the register hole system serving as a register device by means of a plate punch.

Using the apparatus according to the invention, it is possible to manufacture sleeve-shaped printing forms or carrier sleeves, which match one another in terms of fit, position and/or register, for rubber blankets from plate-shaped blanks which both have and have not had images set on them. The invention has thus provided an apparatus for welding sleeve-shaped printing forms or carrier sleeves, by means of which it is possible to produce all formats.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
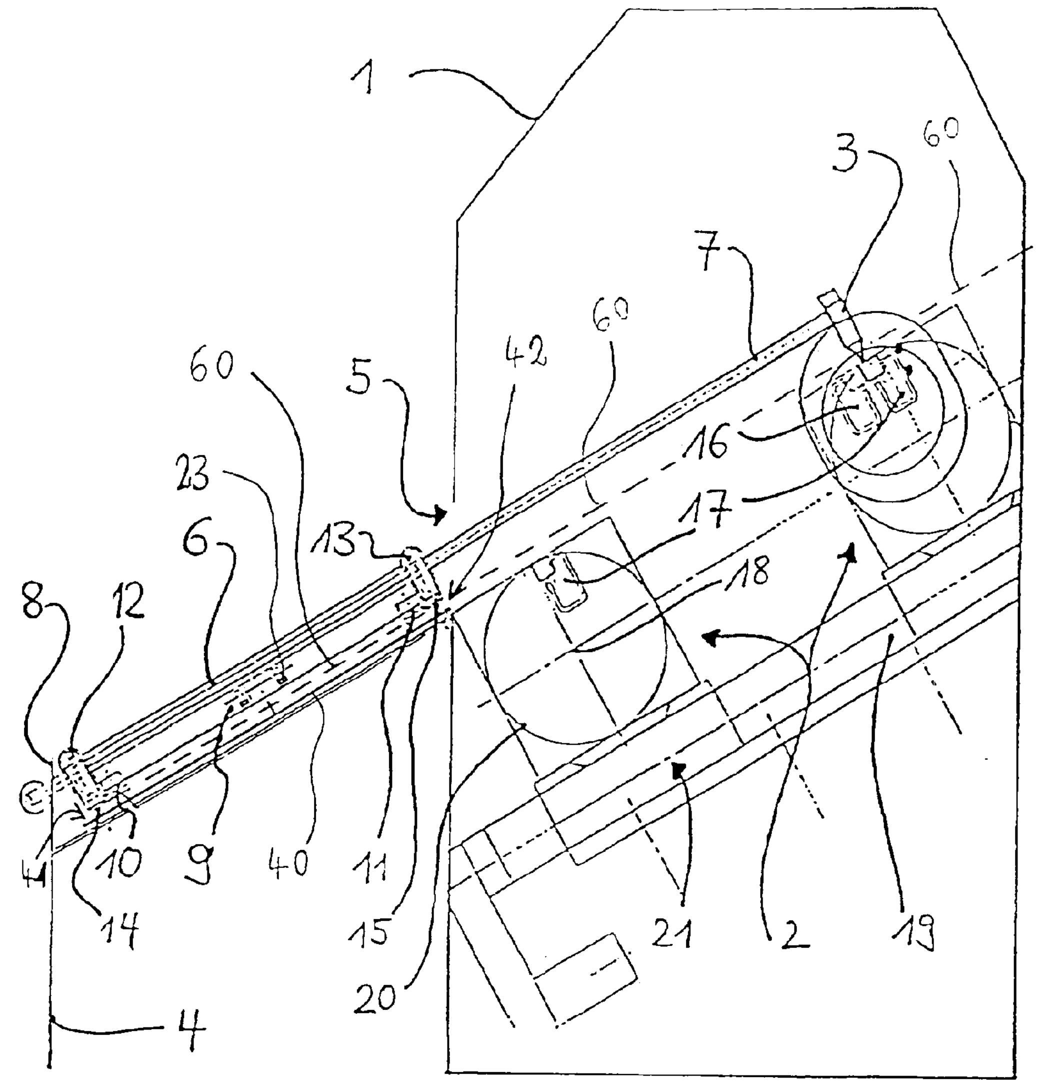
FIG. 1 is a side view of an apparatus according to the invention for producing a sleeve-shaped printing form.
Figure 3:
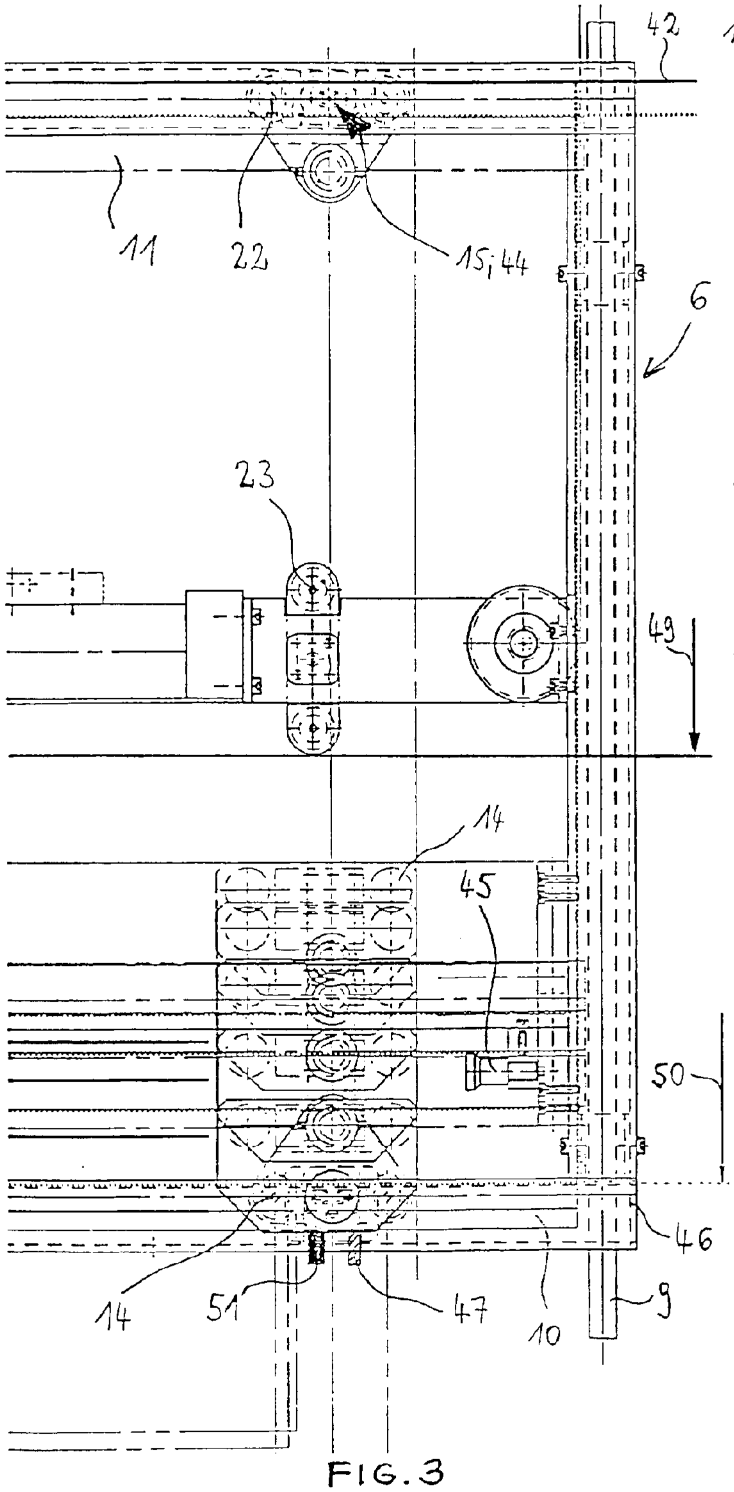
FIG. 3 is a partial plan view of a fixing frame according to FIG. 1.

In FIG. 1, a housing 1 is indicated which is constructed as a radiation protection covering and surrounds a circular shaping device 2 for plate-shaped blanks and a welding system 3.

The radiation protection covering is of metallic design, has no viewing slots and only overlapped doors.

A feed table 4 is arranged outside the housing 1, onto which feed table 4 it is preferably possible to manually place plate-shaped blanks in a manner pre-centered in a recess and/or by means of stops and/or by means of markings.

An opening 5 is let into the housing 1 above the feed table 4, through which opening 5 it is possible to move a device for fixing the plate-shaped blank as a planar blank 40, in the form of a fixing frame 6 which can be adjusted to the appropriate plate size, out of the housing 1 by means of a linear drive 7 over the feed table 4 in order to pick up the blank 40.

The circular shaping device 2, the feed table 4 and the fixing frame 6 are arranged parallel to a straight line 60 (shown as a dashed line), the inclination of the straight line rising in the direction of the welding system 3. The alignment of the circular shaping device 2, the feed table 4 and the fixing frame 6 to the straight line 60 is intended to show that these components are arranged in a common direction in a manner which is inclined with respect to one another or running in oblique fashion. The inclination of the straight line and of the feed table 4, the fixing frame 6, the circular shaping device 2 and possibly even the welding system 3 lies in the range between 5° and 60°, the inclination being selected in such a way that the welded seam quality is not impaired. Ideally, the straight line 60 has an inclination of 30°.

Figure 2:
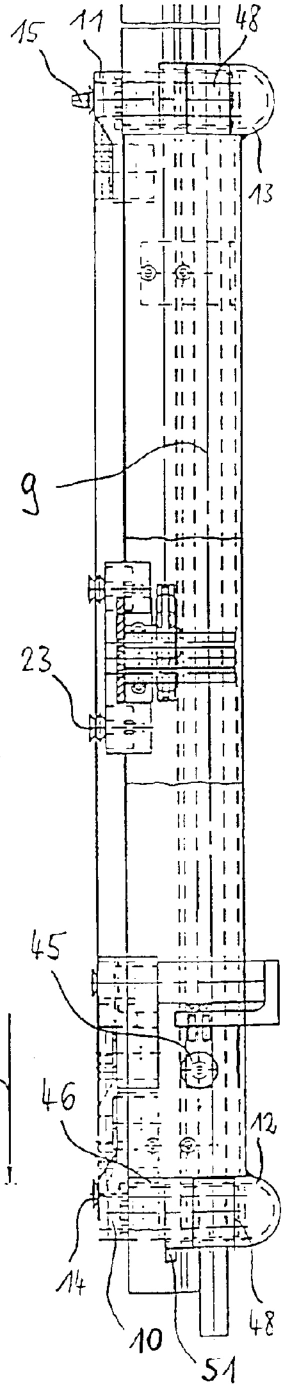
FIG. 2 is a side view of a fixing frame according to FIG. 1.

The fixing frame 6 comprises two fixing bars 10; 11 which can be adjusted on a carriage 9 in accordance with the distance between the plate edges 41; 42 of the blank 40 to be joined and can be set longitudinally on the respective plate edges 41; 42. It is possible to lower both bars 10; 11 onto the blank 40 on the feed table 4 by means of lifting elements 12; 13 which are described in U.S. Pat. No. 5,557,960 and can be actuated, for example, hydraulically or pneumatically. Furthermore, the fixing frame 6 comprises a register device 15 which is designed such that it interacts with a register system 44 arranged at the leading edge 42 of the plate-shaped blank 40 (cf. FIG. 2). It is thus possible to fix the leading plate edge 42 of the plate-shaped blank 40 in-register on the feed table 4 or on the fixing frame 6, for example by means of a pin register 15, which is arranged on the lifting element 13, and a register device 44, preferably in the form of a register hole system 44. Additionally, contact elements 22, preferably in the form of suction elements 22, are fitted in this region, i.e. on the lifting element 13. The leading plate edge 42 which is fixed by means of the pin register 15 and register hole system 44 is held firmly on the fixing frame 6, but, starting from the leading plate edge 42, the blank 40 is not yet fixed on the fixing frame 6 in the direction of its end or the trailing plate edge 41, so that the blank 40 extends along the inclined feed table 4 in the direction of the trailing plate edge 41 as a result of its inherent weight and by this means aligns itself in an in-register and flatly planar manner.

The bar 10 can be adjusted on a carriage 46 driven by a linear drive 45 in accordance with the distance between the plate edges 41; 42 of the blank 40 to be joined, and can be positioned along the respective plate edge.

The position of the plate edge 41, on which the bar 10 is positioned, is determined by means of scanning devices 51 and/or search mechanisms 47 arranged on the carriage 46. The bar 11 is arranged fixedly on the fixing frame 6 in terms of position. It is also alternatively possible (but not shown in greater detail) for the bar 10 to be positioned manually against the trailing edge 41 by an operator.

In a known manner, the lifting elements 12; 13 are configured as suction bars with integrated contact elements 14; 22 which can be turned on and off, preferably suction elements 14; 22, for holding the blank 40 firmly, and the lifting elements 12, 13 are preferably provided with electric clamping magnets which can interact with corresponding soft iron cores of the bars 10, 11. After the bars 10, 11 and the lifting elements 12, 13 have been actuated, the plate-shaped blank 40 is held in a manner ready for transportation at its top side or on the opposite side of the fixing frame 6 from the feed table 4.

Furthermore, the fixing frame 6 comprises contact elements 23, preferably configured as suction elements 23. The suction elements 23 are arranged fixedly in terms of position. Using these suction elements 23 arranged fixedly in terms of position, it is possible, by means of a lifting device 48 which can be actuated, for example, hydraulically or pneumatically, to pick up a plate-shaped blank 40 having a minimum length 49 by suction and fix it to the fixing frame 6 in a manner aligned so as to be level.

For plate-shaped blanks 40 which extend beyond the minimum length 49 and are designed up to a maximum length 50, it is possible to switch on and position the respective suction elements 14 against the trailing plate edge 41, depending on the actual length of the blank 40, the suction elements 14 being additionally required between the region of the minimum length 49 and the maximum length 50 and being configured such that it is possible to move them onto and off the blank 40, in order to pick up a blank 40 of this type extending beyond the minimum length 49 by suction in a positionally stable manner and fix it to the fixing frame 6 in a manner aligned so as to be level.

As an alternative, it is also possible to configure the suction elements 23 to be capable of being moved onto and off the blank 40.

When the suction elements 14 which attract the trailing plate edge 41 by suction and thus fix it are activated, and the suction elements 23 and the pin register 15 interacting with the register hole system 44 are activated, the blank 40 is held in-register on the fixing frame 6 and can be transported in-register.

The data about the length and/or width of the plate-shaped blank 40 are stored, in a manner not shown in greater detail, in a machine controller. It is possible, for example, for these data about the length and/or width of the plate-shaped blank 40 to be input into the machine controller via a keyboard by a person intended to operate the apparatus. The suction elements 14; 23 required for in-register and level transportation in accordance with the input length of the blank 40 are automatically activated by the machine controller.

Furthermore, it is conceivable, in a manner not shown in greater detail, for the optical or mechanical scanning device 51 and/or the search mechanisms 47 to automatically check and determine the size, that is to say both the length and the width, of the plate-shaped blank 40. A controller or regulating device connected to the scanning device 51 and/or the search mechanisms 47 then automatically positions and switches on the suction elements 14; 23 required for fixing on the fixing frame 6 and/or the pin registers 15 in accordance with the determined data with regard to the position of the trailing plate edge 41 and/or the length and width of the blank 40, depending on requirements.

After the suction elements 14; 23 have been positioned and actuated in combination with the pin registers 15 interacting with the register hole system 44 and the plate-shaped blank 40 has been lifted by means of the lifting device 48 and the lifting elements 12; 13, the plate-shaped blank 40 is held in a manner ready for transportation at its top side, or on the opposite side of the fixing frame 6 from the feed table 4, and is arranged on the fixing frame 6 in a manner aligned so as to be level.

The fixing frame 6 can be moved into the housing 1 via the circular shaping device 2 by means of the linear drive 7, which may be a control cable, a gear wheel rack or a chain guiding means supported in rails. It is preferably possible for the final positions of the travel of the fixing frame 6 to be determined inside and outside the housing 1 by means of stops.

The circular shaping device 2 has been described in U.S. Pat. No. 5,992,727, and the functions here are analogous thereto. A fixing bar 16 arranged fixedly in terms of position and a fixing bar 17 which can be moved rotatably about an axis 18 and which can be moved transversely along a sliding guide 19 are provided for the plate edges 41; 42 to be joined.

The transversely movable fixing bar 17 is positioned in accordance with the respective length of the plate-shaped blank 40. The data for positioning the transversely movable fixing bar 17 are provided, for example, by the above-described scanning device and/or the machine controller.

Once the fixing frame 6 has been positioned by means of the appropriately adjusted fixing bars 16, 17, the bars 10, 11 of the fixing frame 6 can be attracted electromagnetically and the plate-shaped blank can be clamped onto the fixing bars 16, 17.

After the plate-shaped blank 40 has been clamped on the fixing bars 16; 17 by means of the electromagnetically attracted bars 10, 11, the suction elements 14; 23 and the pin registers 15 are switched off, so that the plate-shaped blank 40 is now fixed in-register, in a horizontally oriented manner, only between the fixing bars 16; 17 in combination with the bars 10; 11.

The empty fixing frame 6 can be moved out of the working region of the circular shaping device 2 until its housing termination 8 closes off the housing opening 5.

It is known for the fixing bars 16, 17 to be arranged spaced apart from one another in a manner corresponding to the length of the blank to be processed. The blank 40 can be fixed in-register on the fixing bars 16, 17 by the above-described pin register 15, which interacts with the register hole system 44, and the suction elements 14; 23 of the fixing frame 6. In order to shape the sleeve, the bar 17 is rotated and simultaneously displaced transversely in the direction of the fixed bar 16. For this purpose, the bar 17 is installed on a round table 20 which can be moved on the sliding guide 19 in a carriage 21. Here, the bar 17 passes under the fixed bar 16 and is located opposite the fixed bar 16 after one complete revolution, so that the plate edges 41; 42 are likewise located opposite one another.

A welding system in the form of a laser 3 is arranged in the housing 1 over the bars 16, 17 at the location at which the bars 16, 17 are located opposite one another and form a sleeve-shaped printing form, so that it is possible to perform laser cutting and laser welding on the sleeve-shaped printing form, as has already been described in U.S. Pat. No. 5,499,580.

As an alternative, it is also possible, in a manner not shown in greater detail, to configure the feed table as a lifting device, on which it is possible to place a stack of a plurality of plate-shaped blanks. The stack of plate-shaped blanks for the blanks is conveyed to the fixing frame 6 by means of the lifting device. The fixing frame 6 picks up one blank individually in a manner aligned so as to be level from the stack, starting with the uppermost blank, and transports the blank to the circular shaping device 2.

It is possible for a multiplicity of stacks, arranged on pallets for example, to be moved to the position of the lifting device, the stacks then being automatically picked up by the lifting device and the stack being processed item by item as explained above, it being possible for the apparatus for producing a sleeve-shaped printing form to automatically switch off after a stack of plate-shaped blanks for the blanks on the feed table or the lifting device has been processed. The stack is then intended to likewise be identically inclined in a manner corresponding to the inclined position of the feed table and the fixing frame, in order that the fixing frame can pick up and transport the uppermost blank in-register.

As an alternative, instead of the above-described switching-off operation of the apparatus for producing a sleeve-shaped printing form, it is possible for a next stack of blanks arranged on a pallet to be moved to and onto the lifting device in an automated manner by means of a controller and/or regulating device and processed item by item. In this way, it would be possible to create non-stop production of sleeve-shaped printing forms.

The functioning of the apparatus according to the invention proceeds in an analogous manner to the working steps explained in U.S. Pat. No. 5,992,727. It is possible for all the working steps to be performd in an automated manner.

The working step of removing the finished sleeve-shaped printing form from the housing 1 or from the circular shaping device 2, the transportation away by means of a conveying device and the rolling-over operation performd on the welded seams in the conveying device are likewise analogous to the apparatuses described in this patent and to their functioning. In this way, it is possible to automatically perform a multiple sequence of the working steps described in an analogous manner in the patent The apparatus described in the exemplary embodiment is suitable for processing plate-shaped blanks, which can consist of both non-magnetic material and magnetic material.

A variant of the apparatus, which is not shown in greater detail, is to replace the contact elements, which are configured as suction elements and described in the exemplary embodiment, with electric holding magnets, if plate-shaped blanks composed of a magnetic material are being processed, the holding magnets being configured such that they can be positioned and switched on and off like the suction elements according to the size of the blank.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for producing a sleeve-shaped printing plate from a rectangular blank having a leading edge, an opposed trailing edge, and a registration feature toward the leading edge, said apparatus comprising:

a circular shaping device for shaping the rectangular blank;

a welding system for cutting and welding the edges to form a sleeve;

a feed table for positioning said rectangular blank with said leading edge toward said welding system, said feed table being inclined at an angle so that it rises toward said welding system; and a displacement device for picking up the blank from the feed table and transporting it to the circular shaping device, said displacement device comprising a fixing frame having a first lifting element which engages said blank adjacent to said leading edge and a second lifting element which can be moved relative to said first lifting element and can engage said blank adjacent to said trailing edge, said first lifting element comprising a registration feature which engages said registration feature of said blank to align said leading edge of said blank in-register, and at least one contact element for holding said blank in-register, said second lifting element comprising at least one contact element for holding said blank in-register, said second lifting element being movable relative to said first lifting element, whereby, when the registration feature of the first lifting element engages the registration feature of the blank, the blank is aligned level and in-register toward said trailing edge on account of the weight of the blank on the inclined feed table.

2. An apparatus as in claim 1 wherein said blank has a length which lies between a minimum length and a maximum length, said fixing frame further comprising at least one intermediate contact element which holds said blank in-register adjacent to said minimum length, said at least one contact element of said second lifting element being positionable to hold said blank between said minimum length and said maximum length.

3. An apparatus as in claim 2 wherein the at least one intermediate contact element occupies a fixed position on said fixing frame, and the at least one contact element on the second lifting element can be positioned against the trailing plate edge as required for level fixing.

4. An apparatus as in claim 1 further comprising a lifting device for positioning the blank on the fixing frame.

5. An apparatus as in claim 1 wherein said circular shaping device comprises a stationary fixing bar for fixing to said leading edge; and a movable fixing bar for fixing to said trailing edge, said movable fixing bar being mounted on a round table which is transversely movable and rotatable, wherein said fixing frame can position the blank on the fixing bars so that one revolution of the table during transverse movement of the table can bring the edges of the blank into position for cutting and welding the edges to form a sleeve.

6. An apparatus as in claim 1 further comprising means for determining an actual length and an actual width of the rectangular blank.

7. An apparatus as in claim 6 further comprising means for converting the actual length and actual width of the blank into data which can be transferred to a machine controller; and means for switching on and off the holding of said blank by said contact elements.

8. An apparatus as in claim 1 wherein a stack of blanks can be placed on the feed table, said fixing frame being capable of picking up an uppermost blank on said stack, the apparatus further comprising means for switching off the apparatus after the stack has been processed.

9. An apparatus as in claim 1 wherein said welding system comprises at least one laser positioned above the circular shaping device.

10. An apparatus as in claim 1 wherein the contact elements are suction elements.

11. An apparatus as in claim 1 wherein said contact elements comprise electromagnets.

12. An apparatus as in claim 6 wherein said means for determining an actual length and an actual width of the rectangular blank comprises one of an optical and a mechanical scanning device.

13. An apparatus as in claim 6 wherein said means for determining an actual length and an actual width of the rectangular blank comprises search mechanisms.

* * * * *